US012800420B2

(12) United States Patent
He et al.

(10) Patent No.: US 12,800,420 B2
(45) Date of Patent: Nov. 17, 2026

(54) BASE STRAIN GENERATING DEVICE AND BASE STRAIN SENSITIVITY TESTING SYSTEM

(71) Applicant: Zhejiang University, Hangzhou (CN)

(72) Inventors: Wen He, Hangzhou (CN); Yaqi Shi, Hangzhou (CN); Qun Li, Hangzhou (CN); Jie Zhou, Hangzhou (CN); Shushi Jia, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 276 days.

(21) Appl. No.: 18/607,543

(22) Filed: Mar. 17, 2024

(65) Prior Publication Data

US 2024/0310228 A1 Sep. 19, 2024

(30) Foreign Application Priority Data

Mar. 17, 2023 (CN) ......................... 202310262050.6
Mar. 16, 2024 (CN) ......................... 202410301575.0

(51) Int. Cl.
*G01L 25/00* (2006.01)
*G01P 21/00* (2006.01)

(52) U.S. Cl.
CPC .............. *G01L 25/00* (2013.01); *G01P 21/00* (2013.01)

(58) Field of Classification Search
CPC ................................ G01L 25/00; G01P 21/00
See application file for complete search history.

(56) References Cited

U.S. PATENT DOCUMENTS

2009/0266138 A1* 10/2009 McDearmon ........... G01L 25/00 73/1.15

FOREIGN PATENT DOCUMENTS

DE 102019001241 A1 * 8/2020 ............ G01M 7/027

OTHER PUBLICATIONS

English Machine Translation DE-102019001241-A1 (Year: 2020).*

* cited by examiner

*Primary Examiner* — Andrew J Cromer

(57) ABSTRACT

The present application relates to a base strain generating device and a base strain sensitivity testing system. The base strain generating device clamps the middle portion of a strain beam by arranging a clamping assembly, so that the position of a mounting structure is fixed, and a tested sensor arranged at the mounting structure does not generate an additional acceleration component due to the vibration of the strain beam. By adoption of the technical solution, the measurement precision of the base strain sensitivity is improved.

10 Claims, 12 Drawing Sheets

BASE STRAIN GENERATING DEVICE AND BASE STRAIN SENSITIVITY TESTING SYSTEM

CROSS REFERENCE TO RELATED APPLICATIONS

The present application claims the benefit of Chinese Patent Application No. 2023102620506 filed on Mar. 17, 2023 and Chinese Patent Application No. 2024103015750 filed on Mar. 16, 2024. All the above are hereby incorporated by reference in their entirety.

FIELD OF THE INVENTION

The present application relates to the field of sensor testing technology, and particularly to a base strain generating device and a base strain sensitivity testing system.

BACKGROUND OF THE INVENTION

A piezoelectric accelerometer is an inertial sensor based on the piezoelectric effect of the piezoelectric sensing element. Its main components include a base, a piezoelectric sensing element and a mass block, and its structure includes two types: compression type and shear type.

When working, a piezoelectric accelerometer needs to be fixed on a measured object that is vibrating; at this time, a mass block will exert an alternating force on the piezoelectric sensing element. During the measurement process, the sensitive element of the compression type vibration sensor is placed directly on the sensor base, with face-to-face contact between them. Therefore, the deformation of the base caused by strain has a relatively large impact.

When the mounting surface of the piezoelectric accelerometer bends, the base of the piezoelectric accelerometer will produce strain, and the internal piezoelectric element will produce an electric polarization phenomenon due to the strain, and then erroneous output is produced. Therefore, a spurious response will occur under the base strain. The ratio of the acceleration value output by this response to the base strain is called base strain sensitivity.

According to the national standard GB/T 13823.6-1992 Methods for the calibration of vibration and shock pick-ups-Testing of base strain sensitivity, one end of a 1500 mm×76 mm×12.5 mm steel beam is fixed as a strain beam. A vibration sensor is mounted at 40 mm from the fixed end of the strain beam, with its center line perpendicular to the surface of the strain beam. A force is applied to the free end of the strain beam to bend, causing the base of the accelerometer under test to produce a certain amount of bending stress E, then the strain beam is released to allow it to vibrate at its natural vibration frequency, and the accelerometer will produce an output acceleration a, and the maximum output $a_{max}$ is obtained by rotating the accelerometer around the mounting axis, and the base strain sensitivity is defined as:

$$S_\varepsilon = \frac{a_{max}}{\varepsilon}.$$

The currently used method for measuring base strain sensitivity is to fix one end of the strain beam, apply a force to the free end to produce a specified base strain value at the place where the tested sensor is mounted, then release the strain beam to vibrate at its natural vibration frequency; or apply a steady-state excitation to the free end of the strain beam to bend the strain beam. However, the above two methods are to mount a tested sensor 40 mm away from the fixed end of the strain beam, which will cause the sensitive axis of the tested sensor to generate an additional acceleration component during vibration, affecting the measurement accuracy of the base strain sensitivity.

SUMMARY OF THE INVENTION

In view of this, it is necessary to provide a base strain generating device and a base strain sensitivity testing system for the traditional solution that a tested sensor is mounted 40 mm away from the fixed end of the strain beam, which will cause the sensitive axis of the tested sensor to generate an additional acceleration component during vibration, affecting the measurement accuracy of the base strain sensitivity.

In an aspect, the present application provides a base strain generating device for detecting the base sensitivity of a tested sensor, comprising:

- a base,
- a strain beam, the middle portion of the strain beam being provided with a mounting structure for fixedly mounting the tested sensor;
- a clamping assembly, the clamping assembly being fixedly connected to the base and being used for clamping the middle portion of the strain beam so as to fix the position of the mounting structure;
- two sets of magnetic circuit devices, the two sets of magnetic circuit devices being fixedly connected to the base respectively, wherein two ends of the strain beam are provided with one set of magnetic circuit devices respectively; the magnetic circuit devices are used for providing sinusoidal excitation for the end portions of the strain beam so as to enable the two ends of the strain beam to swing in a reciprocating manner, and the direction of the sinusoidal excitation is parallel to the direction of a sensitive axis of the tested sensor.

In another aspect, the present application also provides a base strain sensitivity testing system, comprising:

- the base strain generating device as mentioned in the foregoing content; the base strain generating device comprising a base, a strain beam, a clamping assembly and two magnetic circuit devices;
- a tested sensor which is fixedly mounted on a mounting structure in the middle portion of the strain beam;
- at least two strain gauges which are fixedly mounted in the middle portion of the strain beam and used for measuring strain values within a set range of the mounting structure;
- two displacement sensors, each being fixedly mounted on each magnetic circuit devices, the displacement sensors being used for measuring initial positions of the two ends of the strain beam when the strain beam is static, and after the initial positions of the two ends of the strain beam are used as displacement zero points of the two ends of the strain beam, the two ends of the strain beam being maintained to swing at equal amplitude on the two sides of the displacement zero points all the time through feedback control in the moving process; and
- a control device which is connected to the magnetic circuit devices, the tested sensor, the strain gauges and the displacement sensors and used for at least controlling the magnitude and frequency of sinusoidal excitation output by the magnetic circuit devices, obtaining the strain values output by the strain gauges, obtaining displacement values output by the displacement sensors and obtaining an acceleration value output by the tested sensor.

The present application relates to a base strain generating device and a base strain sensitivity testing system. The base strain generating device clamps the middle portion of a strain beam by arranging a clamping assembly, so that the position of a mounting structure is fixed, and a tested sensor arranged at the mounting structure does not generate an additional acceleration component due to the vibration of the strain beam. Meanwhile, two sets of magnetic circuit devices are arranged to provide sinusoidal excitation for the two ends of the strain beam respectively, so that the two ends of the strain beam swing in a reciprocating manner. Furthermore, by controlling the magnitude and frequency of the sinusoidal excitation, vibration with stable amplitude can be generated, and then the base strain sensitivity under different frequencies or different base strains is measured. By adoption of the technical solution, the mounting position of the tested sensor does not generate displacement, then the tested sensor does not have additional acceleration output, and the measurement precision of the base strain sensitivity is improved.

BRIEF DESCRIPTION OF THE DRAWINGS

The accompanying drawings, which constitute a part of the present application, are included to provide a further understanding of the present application so that other features, objects and advantages of the present application will become apparent. The drawings and descriptions of the exemplary embodiments of the present application are used to explain the present application and do not constitute an improper limitation of the present application.

REFERENCE NUMERALS

100—base strain generating device; 110—base; 120—strain beam; 121—mounting structure;

122—first positioning groove; 123—second positioning groove; 130—clamping assembly; 131—frame;

131*a*—bottom plate; 131*b*—overhanging arm; 132—fixed rod; 132*a*—second conical portion; 134—movable screw;

134*a*—first conical portion; 135—first T-steel; 136*a*—first horizontal section; 136*b*—first vertical section;

136—second T-steel; 137*a*—second horizontal section; 137*b*—second vertical section;

137*c*—bolt adjusting through hole; 138*a*—sealing plate; 138*b*—first arc-shaped piece;

138*c*—second arc-shaped piece;

138*d*—supporting block; 139*a*—groove; 139*b*—supporting bead; 139*c*—tightening auxiliary mechanism;

140—magnetic circuit device; first protecting plate—140*a*; second protecting plate—140*b*; first side magnetic conductive plate—141*a;* second side magnetic conductive plate—141*b*; first yoke fixed plate—142*a*; second yoke fixed plate—142*b;* first magnet—143A; second magnet—143*b*; yoke—144; coil bobbin—145*a;* coil winding groove—145*b*; drive coil—146; pressing plate—147; cover plate—148*a*; limiting plate—148*b;* first boss—149*a*; second boss—149*b*; test body—149; sealing plate-149*d;* displacement sensor mounting hole—149*e*; T-shaped fixed block—150;

magnetic gap—1; left magnetic inductance line—2; right magnetic inductance line—3;

10—base strain sensitivity test system; 200—control device; 300—tested sensor;

400—strain gauge; 500—displacement sensor.

DETAILED DESCRIPTION

In order to make the object, technical solutions and advantages of the present application clearer, the present application will be further described in detail below in conjunction with drawings and embodiments. It should be understood that the specific embodiments described herein are only used to explain rather than limit the present application.

The present application provides a base strain generating device 100 for detecting the base strain sensitivity of a tested sensor 300.

Figure 1:
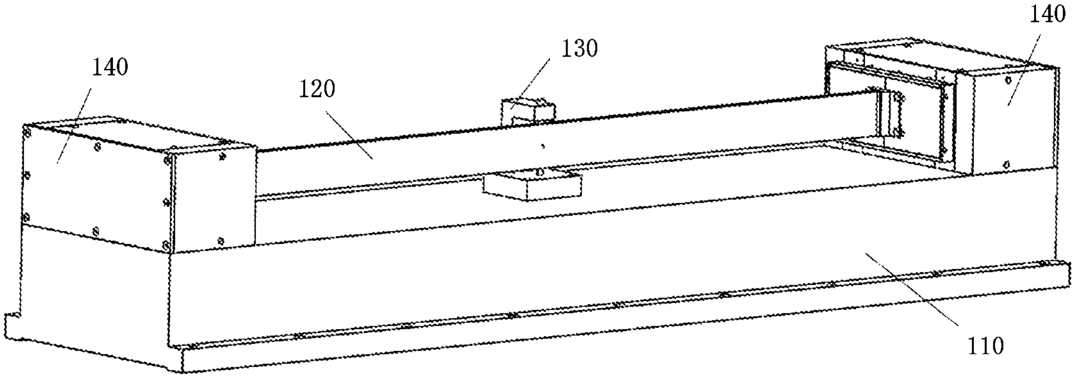
FIG. 1 is a schematic structural diagram of a base strain generating device according to an embodiment of the present application.
Figure 4:
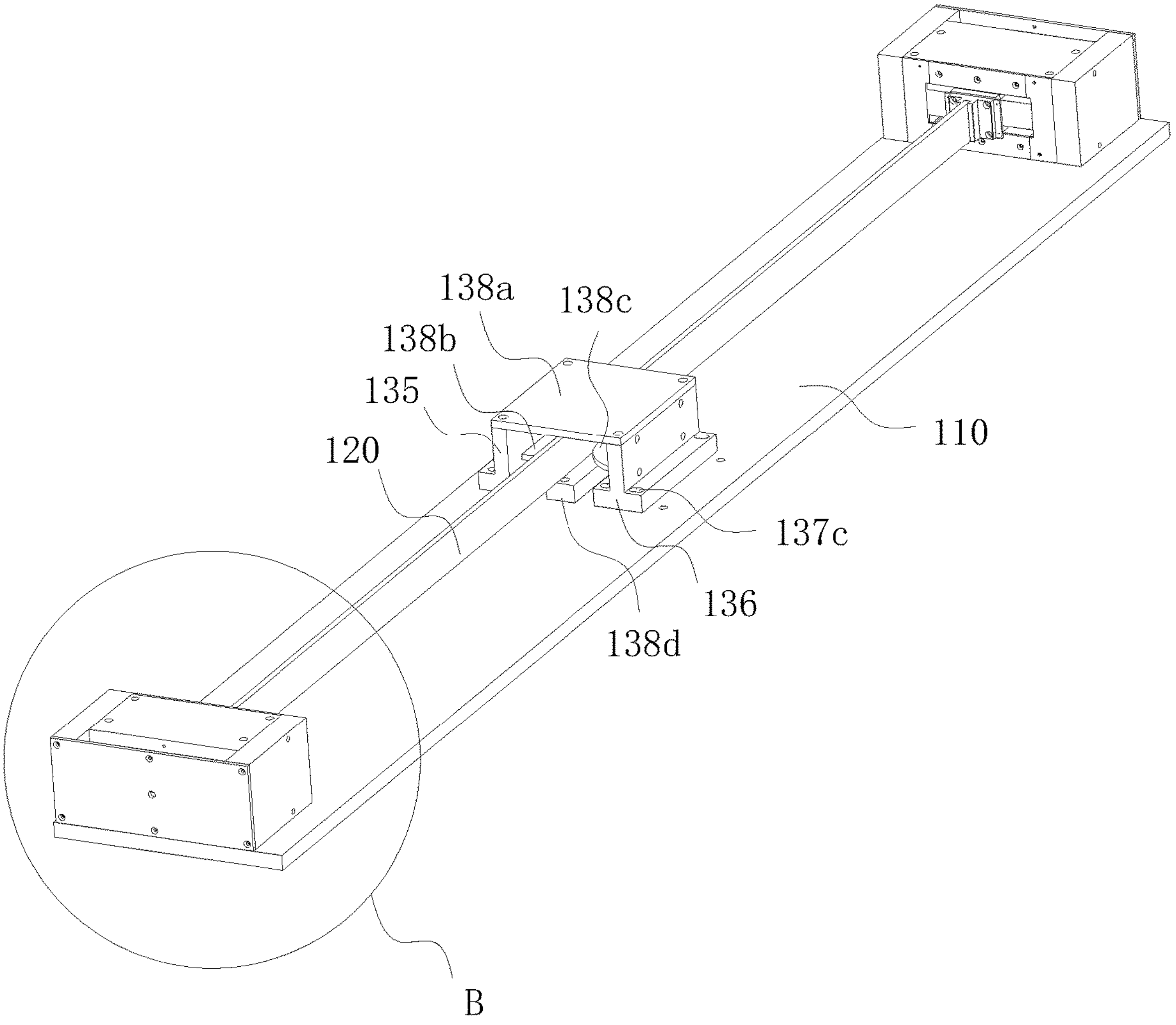
FIG. 4 is a schematic structural diagram of a base strain generating device according to another embodiment of the present application.

As shown in FIG. 1 and FIG. 4, in an embodiment of the present application, the base strain generating device 100 includes a base 110, a strain beam 120, a clamping assembly 130 and a magnetic circuit device 140.

The middle portion of the strain beam 120 is provided with a mounting structure 121 for fixedly mounting the tested sensor 300. The clamping assembly 130 is fixedly connected to the base 110 and is used for clamping the middle portion of the strain beam 120 so as to fix the position of the mounting structure 121. Two sets of magnetic circuit devices 140 are provided; the two sets of magnetic circuit devices 140 are fixedly connected to the base 110 respectively, wherein two ends of the strain beam 120 are provided with one set of magnetic circuit devices 140 respectively; the magnetic circuit devices 140 are used for providing sinusoidal excitation for the end portions of the strain beam 120 so as to enable the two ends of the strain beam 120 to swing, and the direction of the sinusoidal excitation is parallel to the direction of a sensitive axis of the tested sensor 300.

Specifically, the tested sensor 300 may be a piezoelectric accelerometer.

In this embodiment, the middle portion of the strain beam 120 is clamped by arranging the clamping assembly 130, so that the position of the mounting structure 121 is fixed, and the tested sensor 300 arranged at the mounting structure 121 does not generate an additional acceleration component due to the vibration of the strain beam 120. Meanwhile, two sets of magnetic circuit devices 140 are arranged to provide sinusoidal excitation for the two ends of the strain beam 120 respectively, so that the two ends of the strain beam 120 swing in a reciprocating manner. Furthermore, by controlling the magnitude and frequency of the sinusoidal excitation, vibration with stable amplitude can be generated, and then the base strain sensitivity under different frequencies or different base strains is measured. By adoption of the technical solution, the mounting position of the tested sensor 300 does not generate displacement, then the tested sensor 300 does not have additional acceleration output, and the measurement precision of the base strain sensitivity is improved.

Figure 2:
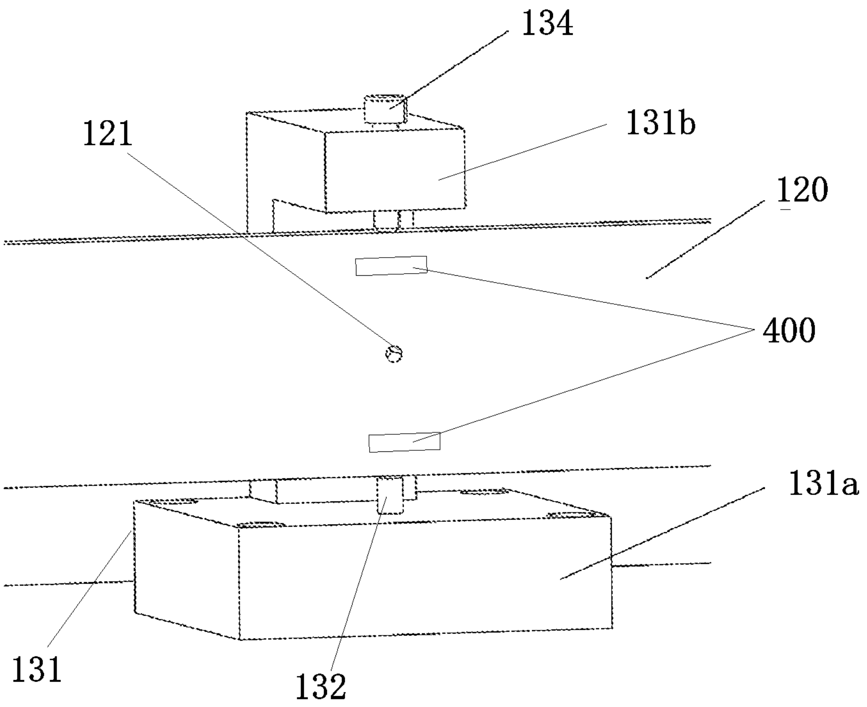
FIG. 2 is a schematic structural diagram of a clamping assembly in the base strain generating device according to the embodiment illustrated in FIG. 1.

As shown in FIG. 1 and FIG. 2, in an embodiment of the present application, the spacing between the two sets of magnetic circuit devices 140 and the mounting structure 121 is equal in the length direction of the strain beam 120.

In this embodiment, by arranging two sets of magnetic circuit devices 140, the same sinusoidal excitation is applied to both ends of the strain beam 120 at the same time, so that both sides of the base of the tested sensor 300 are subjected to a uniform bending force; thus the base generates uniform strain and the measurement accuracy is improved.

Figure 6:
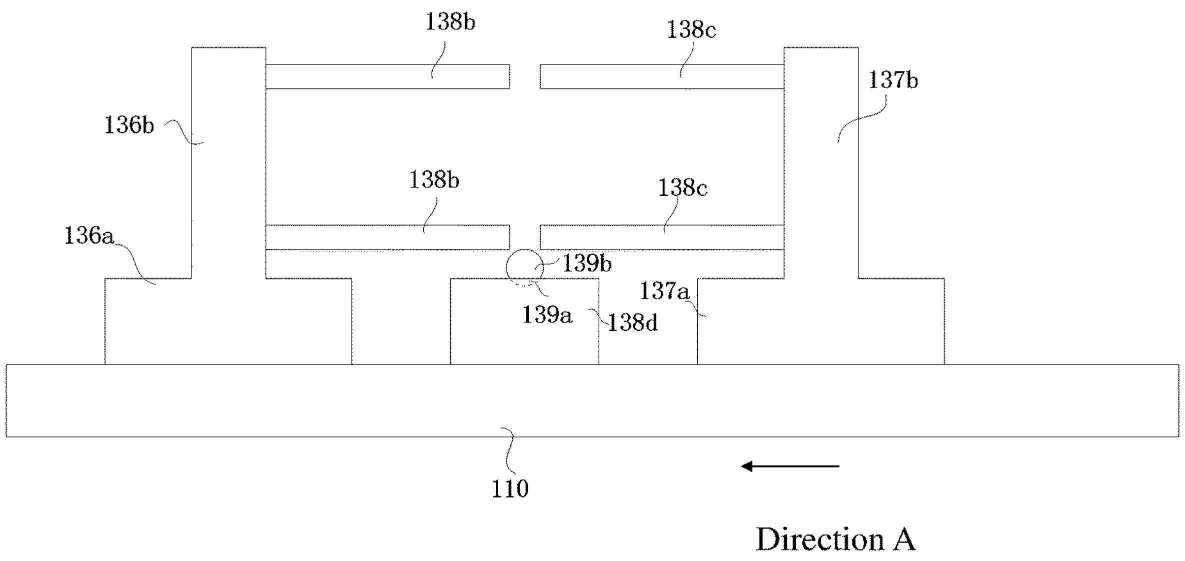
FIG. 6 is a schematic diagram illustrating the positional relationship between a clamping assembly, a groove and a supporting bead of the base strain generating device according to the embodiment illustrated in FIG. 4.

As shown in FIG. 2 and FIG. 6, in an embodiment of the present application, the clamping assembly 130 and the middle portion of the strain beam 120 are clamped with each other in a line contact mode.

In this embodiment, the purpose of arrangement of line contact is to clamp the strain beam 120 without affecting the bending change of the middle portion of the strain beam 120.

As shown in FIG. 2, in an embodiment of the present application, the mounting structure 121 is arranged to be a mounting hole site. The mounting hole site penetrates through the strain beam 120. The central axis of the mounting hole site is parallel to the direction of sinusoidal excitation. When a tested sensor 300 is fixedly mounted in the mounting hole site, the sensitive axis of the tested sensor 300 coincides with the central axis of the mounting hole site.

In this embodiment, the tested sensor 300 is fixed by using a mounting hole site, and through the matching between the threaded hole of the tested sensor 300 and the mounting hole site on the strain beam 120, and mounting with fastening screws, the mounting structure is simple and does not affect the deformation of the strain beam 120; and the base of the tested sensor 300 is in direct contact with the strain beam 120, so that the deformation of the strain beam 120 can be better transmitted to the base of the tested sensor 300, improving the measurement accuracy of the base strain of the tested sensor 300.

Certainly, the specific form of the mounting structure 121 is not limited, clamping or jamming, etc. can be adopted so that the base of the tested sensor 300 can be in sufficient contact with the strain beam 120.

In an embodiment of the present application, a plurality of mounting structures 121 can be provided in a direction perpendicular to the extension of the strain beam 120 to detect multiple tested sensors 300 simultaneously.

As shown in FIG. 2, in an embodiment of the present application, the clamping assembly 130 includes a frame 131, a fixed rod 132 and a movable screw 134.

The frame 131 includes a bottom plate **131*a* and an overhanging arm 131*b*. The bottom plate 131*a* is fixedly arranged on the base 110. The fixed rod 132 is fixedly arranged on the bottom plate 131*a*. The top surface of the fixed rod 132 is opposite to the bottom surface of the strain beam 120, and a gap is formed between the top surface of the fixed rod 132 and the bottom surface of the strain beam 120**.

A movable screw 134 is screwed to the overhanging arm **131*b*. The mounting direction of the movable screw 134 coincides with the central axis of the fixed rod 132 and is perpendicular to and intersects with the central axis of the mounting hole site. The bottom surface of the movable screw 134 is opposite to the top surface of the strain beam 120, and a gap is formed between the bottom surface of the movable screw 134 and the top surface of the strain beam 120**.

When the movable screw 134 is rotated, the movable screw 134 and the fixed rod 132 approach each other, so that the strain beam 120 is clamped between the movable screw 134 and the fixed rod 132.

In this embodiment, the fixed rod 132 and the movable screw 134 are provided to limit the position on both sides of strain beam 120 respectively; by limiting the relative position between the central axis of the movable screw 134 and the fixed rod 132 and the central axis of the mounting hole site, the mounting hole site will not produce displacement caused by the vibration at both ends of the strain beam 120, thus the sensitive axis of the tested sensor 300 will not generate additional acceleration components.

Figure 3:
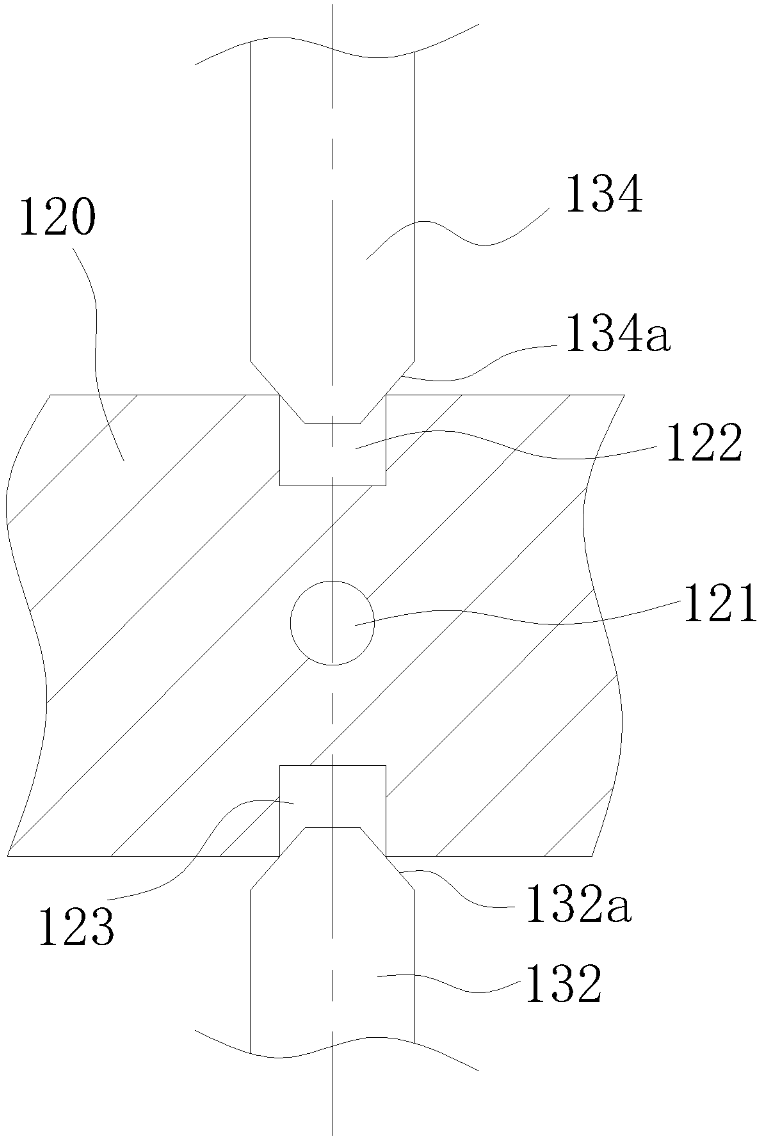
FIG. 3 is a schematic structural diagram of a clamping assembly and a strain beam in a clamping state in the base strain generating device according to the embodiment illustrated in FIG. 1.

As shown in FIG. 3, in an embodiment of the present application, a first positioning groove 122 is formed in the top surface of the strain beam 120, and a first conical portion **134*a* is arranged at the end, close to the strain beam 120, of the movable screw 134. The minimum diameter of the first conical portion 134*a* is smaller than the inner diameter of the first positioning groove 122, and the maximum diameter of the first conical portion 134*a* is larger than the inner diameter of the first positioning groove 122. When the strain beam 120 is clamped, at least part of the first conical portion 134***a* is inserted into the first positioning groove 122.

A second positioning groove 123 is formed in the bottom surface of the strain beam 120, and a second conical portion 132*a* is arranged at the end, close to the strain beam 120, of the fixed rod 13. The minimum diameter of the second conical portion 132*a* is smaller than the inner diameter of the second positioning groove 123, and the maximum diameter of the second conical portion 132*a* is larger than the inner diameter of the second positioning groove 123. When the strain beam 120 is clamped, at least part of the second conical portion 132*a* is inserted into the second positioning groove 123.

In this embodiment, through the matching between the first conical portion 134*a* and the first positioning groove 122, and the matching between the second conical portion 132*a* and the second positioning groove 123, both the movable screw 134 and the fixed rod 132 are in line contact with the strain beam 120, so that the influence of the clamping assembly 130 on the bending of the strain beam 120 is reduced as much as possible.

As shown in FIG. 4 and FIG. 6, in an embodiment of the present application, the clamping assembly 130 includes a first T-shaped steel 135, a second T-shaped steel 136, a plurality of first arc-shaped pieces 138*b*, a plurality of second arc-pieces shaped 138*c* and a supporting block 138*d*.

The first T-shaped steel 135 includes a first horizontal section 136*a* and a first vertical section 136*b* which are fixedly connected to each other.

The second T-shaped steel 136 includes a second horizontal section 137*a* and a second vertical section 137*b* which are fixedly connected to each other. The first horizontal section 136*a* and the second horizontal section 137*a* are arranged oppositely, and a spacing is formed between the first horizontal section 136*a* and the second horizontal section 137*a*. The first vertical section 136*b* and the second vertical section 137*b* are arranged oppositely, and a spacing is formed between the first vertical section 136*b* and the second vertical section 137*b*.

The sealing plate 138*a* covers the top surface of the first vertical section 136*b* and the top surface of the second vertical section 137*b*, and the sealing plate 138*a* is fixedly connected to the top surface of the first vertical section 136*b* and the top surface of the second vertical section 137*b* respectively.

A plurality of the first arc-shaped pieces 138*b* are fixedly connected to the surface, close to the second vertical section 137*b*, of the first vertical section 136*b*. A plurality of second arc-shaped pieces 138*c* are fixedly connected to the surface, close to the first vertical section 136*b*, of the second vertical section 137*b*. Each first arc-shaped piece 138*b* is provided with one second arc-shaped piece 138 which is arranged opposite to the first arc-shaped piece, and the first arc-shaped pieces 138*b* and the second arc-shaped pieces 138*c*, which are oppositely arranged, are located on the same horizontal plane.

The supporting block 138*d* is arranged between the first T-shaped steel 135 and the second T-shaped steel 136. A first spacing is formed between the first horizontal section 136*a* and the supporting block 138*d*, and a second spacing is formed between the second horizontal section 137*a* and the supporting block 138*d*.

When the clamping assembly is in a use state, the middle portion of the strain beam 120 is clamped between the first arc-shaped piece 138*b* and the second arc-shaped piece 138*c*, and the bottom of the strain beam 120 abuts against the top surface of the supporting block 138*d*, so that the supporting block 138*d* supports the strain beam 120.

Specifically, the first T-shaped steel 135 may be No. 45 steel, and the second T-shaped steel 136 may be No. 45 steel. No. 45 steel is a high-quality carbon structural steel. It is a medium-carbon steel with a carbon content of more than 0.4%. It has low hardness and is easy to machine.

When the clamping assembly 130 is in a use state, four arc-shaped pieces are in contact with the strain beam 120 to form line contact. The arc-shaped pieces are configured as a sheet-like structure with arc-shaped edges. Alternatively, the shape of the arc-shaped pieces can be half of a circular piece, i.e., a semi-circular piece.

In this embodiment, the arc-shaped pieces are configured as a sheet-like structure with arc-shaped edges instead of a cylinder or other shape, which can facilitate to reach into the interior of the clamping assembly 130 with hands to disassemble the tested sensor 300 arranged on the middle portion of the strain beam 120.

It should be noted that the first spacing may be equal to the second spacing. However, during actual use of the base strain generating device, when the clamping assembly 130 and the strain beam 120 are clamped, since the position of the second T-shaped steel 136 is fine-tuned, the second spacing is not equal to the second spacing from a microscopic perspective, but the first spacing and the second spacing are not much different, and the difference is in millimeters.

As shown in FIG. 6, in an embodiment of the present application, the clamping assembly also includes a groove 139*a* and a supporting bead 139*b*.

The groove 139*a* is formed in the top surface of a supporting block 138*d*. The supporting bead 139*b* is embedded into the groove 139*a*. The groove face of the groove 139*a* is matched with the supporting bead 139*b* in shape.

When the clamping assembly 130 is in a use state, the top of the supporting bead 139*b* makes point contact with the bottom surface of a strain beam 120, and the bottom of the supporting bead 139*b* makes surface contact with the groove face of the groove 139*a*, so that the supporting block 138*d* supports the strain beam 120.

In this embodiment, by arranging the groove 139*a* and the supporting bead 139*b*, when the middle portion of the strain beam 120 is clamped, under the synergistic effect of the supporting bead 139*b* and supporting block 138*d*, the strain beam 120 is supported, and the bending change of the middle portion of the strain beam 120 is not affected.

Figure 5:
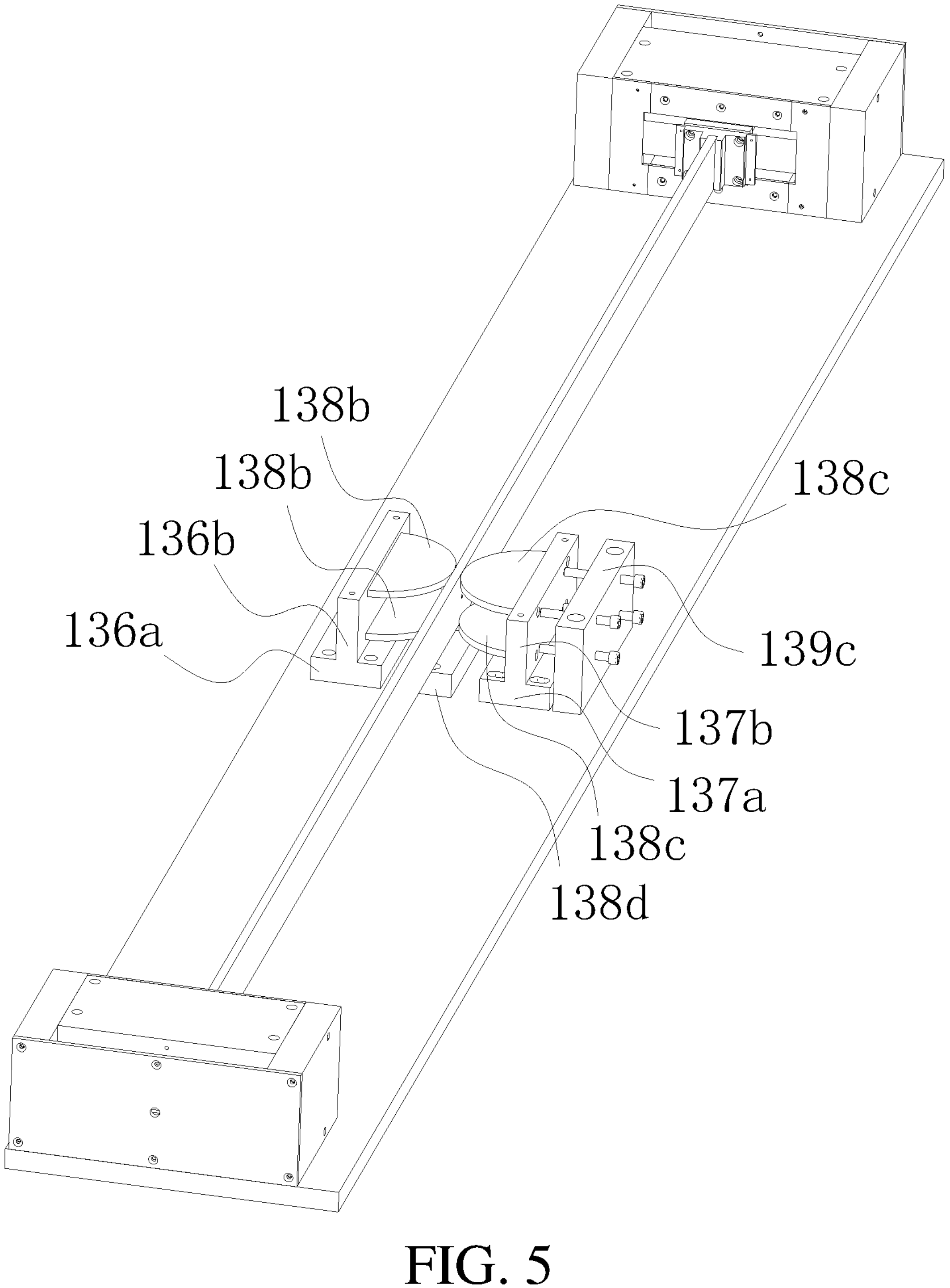
FIG. 5 is a schematic structural diagram of the base strain generating device according to the embodiment illustrated in FIG. 4 after removal of a sealing plate.

As shown in FIG. 5, in an embodiment of the present application, the clamping assembly further includes a tightening auxiliary mechanism 139*c*.

The tightening auxiliary mechanism 139*c* is arranged on the side, away from the first vertical section 136*b*, of the second vertical section 137*b*.

When the first T-shaped steel 135 is tightened and fixed to the base 110, and the middle portion of the strain beam 120 is arranged between the first arc-shaped piece 138*b* and the second arc-shaped piece 138*c*, the tightening auxiliary mechanism 139*c* moves in the direction close to the second T-shaped steel 136 and is tightened, and the tightening auxiliary mechanism 139*c* abuts against the second vertical section 137*b*, so that the second arc-shaped piece 138*c* abuts against the middle portion of the strain beam 120, and the first arc-shaped piece 138*b* and the second arc-shaped piece 138*c* clamp the middle portion of the strain beam 120.

Specifically, the tightening auxiliary mechanism 139*c* is of a plate-like structure.

The first horizontal section 136*a* of the first T-shaped steel 135 is provided with a plurality of circular through holes, and the first T-shaped steel 135 is connected to the base via a bolt through the circular through holes.

The supporting block 138*d* is provided with a plurality of circular through holes, and the supporting block 138*d* is connected to the base via a bolt through the circular through holes.

The second T-shaped steel 136 is provided with a plurality of bolt adjusting through holes 137*c*. The bolt adjusting through holes 137*c* are of strip shape. The bolts can be slid and adjusted along the length direction of the bolt adjusting through hole 137*c* within the length and size range of the bolt adjusting holes, to fine-adjust the arrangement position of the second T-shaped steel 136. The length direction of the bolt adjusting through hole 137*c* is equal to the direction in which the second T-shaped steel 136 approaches or moves away from the supporting block 138*d*.

The tightening auxiliary mechanism 139*c* is provided with a plurality of circular through holes. The clamping assembly also includes a plurality of screws used in conjunction with the tightening auxiliary mechanism 139*c*. Each screw is inserted into a circular through hole of the tightening auxiliary mechanism 139*c*. By tightening these screws, the tightening auxiliary mechanism 139*c* gradually approaches the second T-shaped steel 136, until the ends of these screws abut against the surface of the second vertical section 137*b*, so that the tightening auxiliary mechanism 139*c* bears against the second horizontal section 137*a*, thus allowing the second T-shaped steel 136 together with the second arc-shaped piece 138*c* to move closer to the strain beam 120, and the second arc-shaped piece 138*c* bears against the strain beam 120, allowing the strain beam 120 to be clamped by the first arc-shaped piece 138*b* and the second arc-shaped piece 138*c*.

During mounting, the supporting block 138*d* is connected to the base 110 via a bolt, and the position is fixed.

The detailed operating steps for clamping the clamping assembly 130 and the strain beam 120 in this embodiment are as follows:

S100, determine the relative position of the first T-shaped steel 135 and the supporting block 138*d*. After determination, tighten the bolts of the first T-shaped steel 135 so that the first T-shaped steel 135 is fastened to the base 110, and tighten the bolts of the supporting block 138*d* so that the first T-shaped steel 135 is fastened to the base 110. By fastening the first T-shaped steel 135 and the supporting block 138*d*, a positional benchmark is provided as a reference for subsequent fine-tuning of the position of the second T-shaped steel 136.

S200, insert the bolt into the bolt adjusting through hole 137*c* of the second T-shaped steel 136, but the bolt is not tightened.

S300, place the strain beam 120 between the first arc-shaped piece 138*b* and the second arc-shaped piece 138*c*, and adjust the position centrally so that the middle portion of the strain beam 120 is located between the first arc-shaped piece 138*b* and the second arc-shaped piece 138*c*, and the bottom surface of the strain beam 120 abuts against the top of the supporting bead 139*b*. Alternatively, there are two first arc-shaped pieces 138*b* and two second arc-shaped pieces 138*c*.

S400, tighten the screws of the tightening auxiliary mechanism 139*c* toward the second T-shaped steel 136, so that the tightening auxiliary mechanism 139*c* bears against the second vertical section 137*b* of the second T-shaped steel 136, and the tightening auxiliary mechanism 139*c* bears against the second T-shaped steel 136, and thus the second arc-shaped piece 138*c* on the second T-shaped steel 136 can bear against the strain beam 120, and the strain beam 120 is clamped between the first arc-shaped piece 138*b* and the second arc-shaped piece 138*c*. At this time, the second T-shaped steel 136 will produce fine position adjustment in the direction A. S500, tighten the bolt in the bolt adjusting through hole 137*c* of the second T-shaped steel 136 to fix the position of the second T-shaped steel 136.

As shown in FIG. 7, FIG. 8, FIG. 9 and FIG. 10, in an embodiment of the present application, the magnetic circuit module includes a first magnet 143*a*, a second magnet 143*b*, a coil bobbin 145*a*, a yoke 144 and a drive coil 146.

The second magnet 143*b* is parallel to and opposite to the first magnet 143*a*. A gap is provided between the first magnet 143*a* and the second magnet 143*b*. A coil bobbin 145*a* is arranged in the gap between the first magnet 143*a* and the second magnet 143*b*. The coil bobbin 145*a* is configured as a rectangular frame and has a hollow portion.

The yoke 144 is arranged in the hollow portion of the coil bobbin 145*a*. The drive coil 146 is wound around the coil bobbin 145*a*.

The first magnet 143*a* and the second magnet 143*b* are both magnetic, and the yoke 144 is made of permeability magnetic materials. When the magnetic circuit device 140 is in a use state, a sinusoidal current is supplied to the drive coil 146, and a first air-gap magnetic field is formed between the second magnet 143*b* and the yoke 144, and a second air-gap magnetic field is formed between the second magnet 143*b* and the yoke 144. The drive coil 146 is subjected to an Ampere force perpendicular to the direction of the magnetic field.

Specifically, the drive coil 146 is driven by an Ampere force perpendicular to the direction of the magnetic field. As a consequence, the coil bobbin 145*a* moves horizontally in the direction perpendicular to the magnetic induction line.

Figure 13:
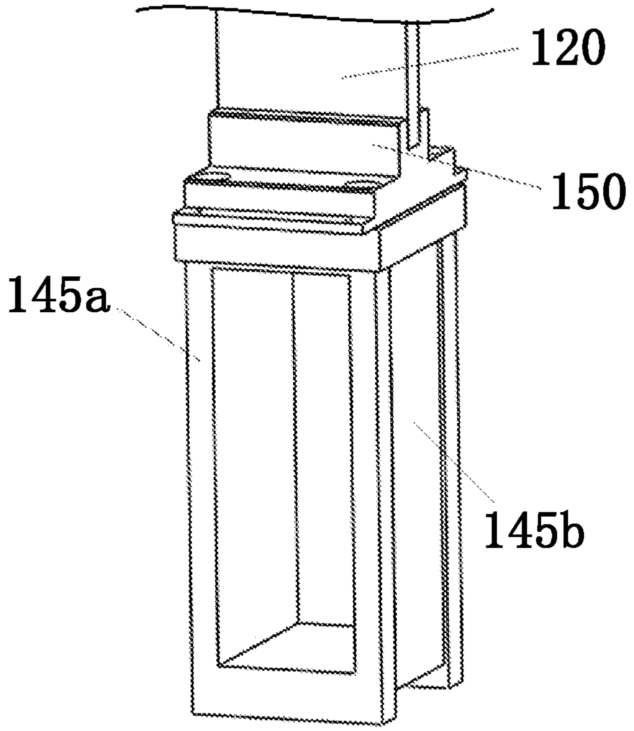
FIG. 13 is a schematic structural diagram of a coil bobbin and a coil winding groove in one magnetic circuit device of the base strain generating device according to the embodiment illustrated in FIGS. 1 and 4 (enlarged view of B in FIG. 4).

As shown in FIG. 13, in an embodiment of the present application, the coil bobbin 145*a* includes an outer frame and an inner frame. The coil bobbin 145*a* includes an outer frame and an inner frame. The outer frame of the coil bobbin 145*a* is provided with a coil winding groove 145*b*. The coil winding groove 145*b* is used to accommodate the drive coil 146.

Specifically, the coil winding groove 145*b* is used to accommodate the drive coil 146. In the energized state, the drive coil 146 turns on a steady-state sinusoidal changing current, and the current passing through the drive coil 146 is a sinusoidal current. Taking the embodiment of FIG. 14 as an example, the direction of the magnetic induction line is horizontal, i.e., along the X-axis (the direction of the magnetic induction line is shown in FIG. 14), so the drive coil 146 will be subjected to the steady-state sinusoidal Ampere force perpendicular to the direction of the magnetic field, i.e., the Ampere force along the Y-axis direction (the direction of the Ampere force is shown in FIG. 10); thus the coil bobbin 145 and the drive coil 146 can move back and forth.

Figure 14:
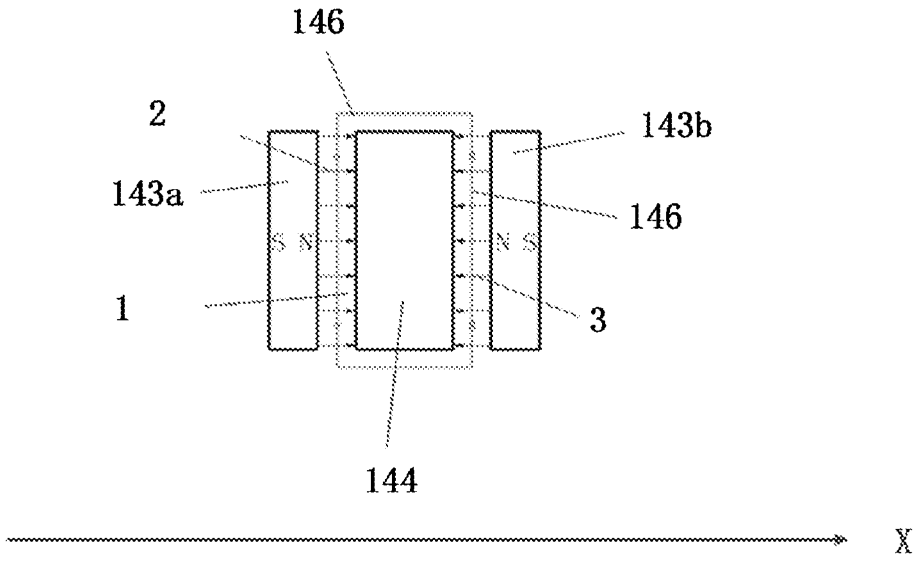
FIG. 14 is an explanatory diagram of a magnetic induction line of the base strain generating device according to the embodiment illustrated in FIGS. 1 and 4.

As shown in FIG. 14, in an embodiment of the present application, the side, close to the yoke 144, of the first magnet 143*a* is an N pole, and the side, away from the yoke 144, of the first magnet 143*a* is an S pole. The side, close to the yoke 144, of the second magnet 143*b* is an N pole, and the side, away from the yoke 144, of the second magnet 143*b* is an S pole.

Specifically, the direction of the left magnetic inductance line 2 is to flow from the N pole of the magnet to the yoke 144 and then back to the S pole of the magnet, forming a counterclockwise closed loop. The direction of the right magnetic inductance line 3 is to flow from the N pole of the magnet to the yoke 144 and then back to the S pole of the magnet, forming a clockwise closed loop.

Figure 9:
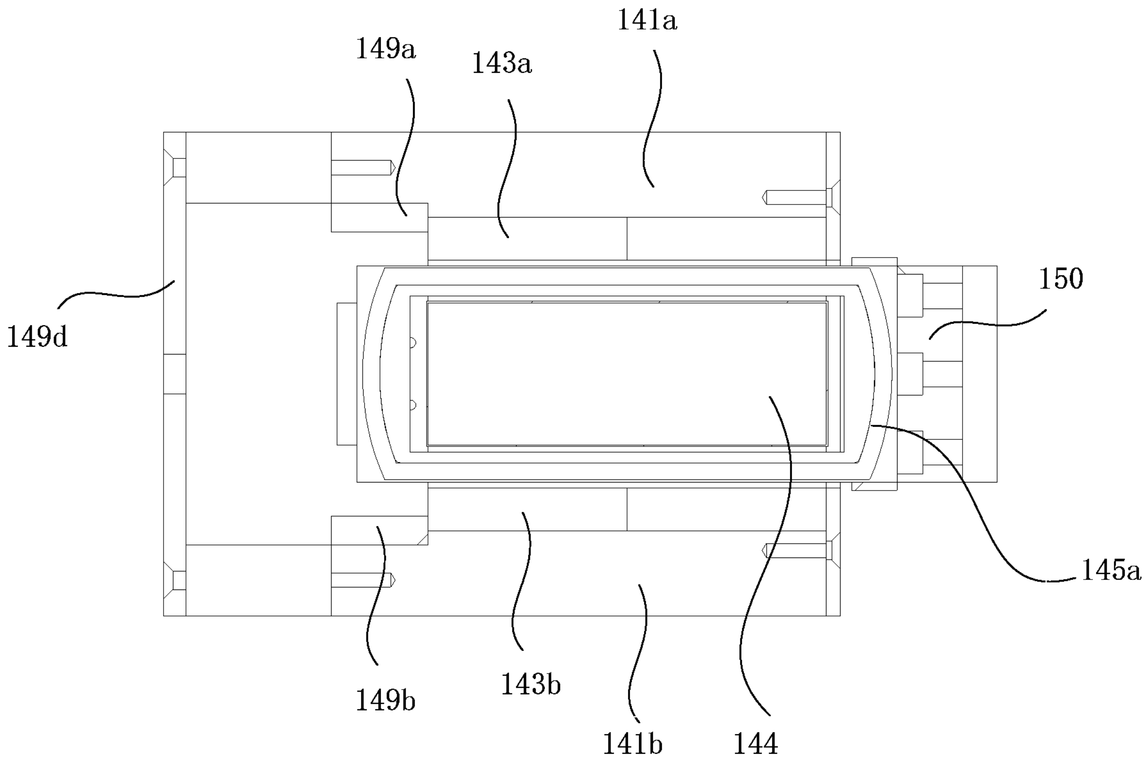
FIG. 9 is a view from an angle of one magnetic circuit device of the base strain generating device according to the embodiment illustrated in FIGS. 1 and 4 (enlarged view of B in FIG. 4).
Figure 10:
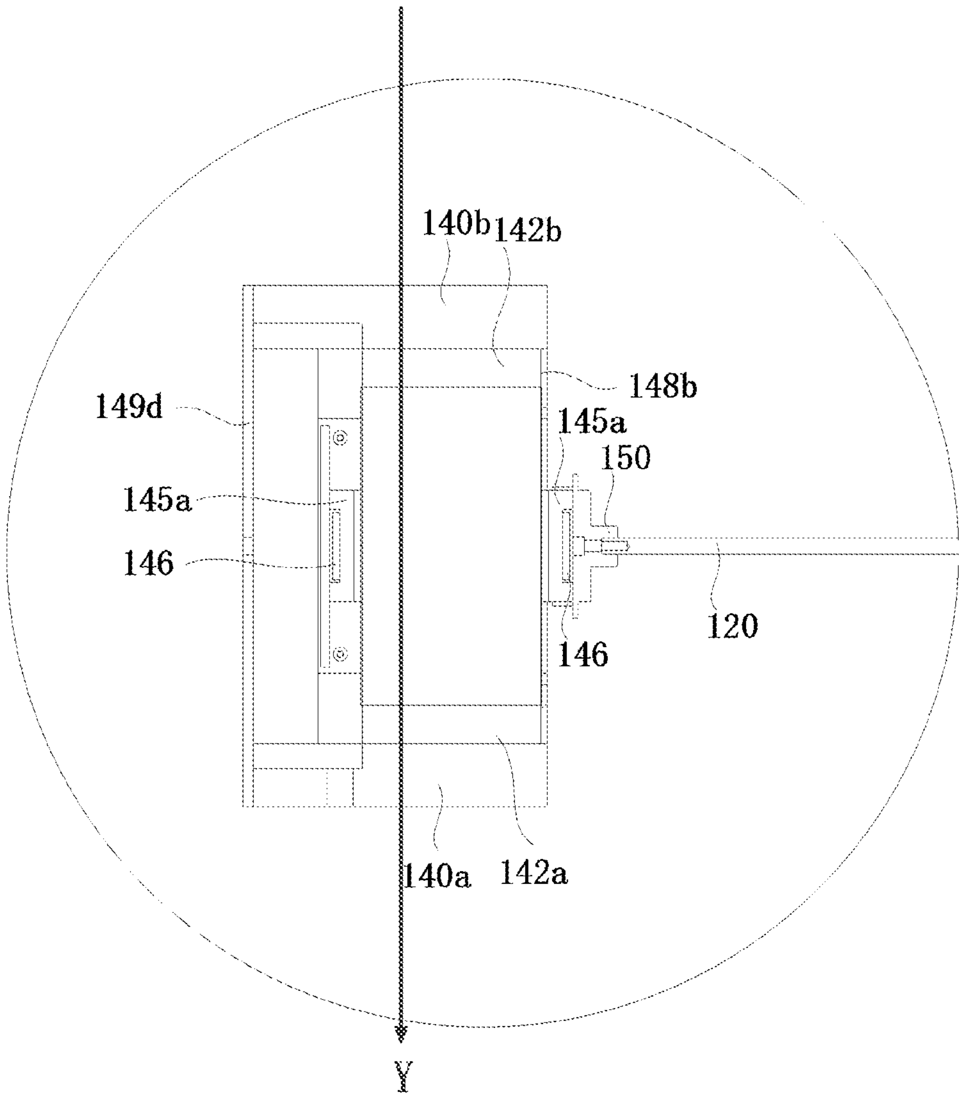
FIG. 10 is a view from another angle of one magnetic circuit device of the base strain generating device according to the embodiment illustrated in FIGS. 1 and 4 (enlarged view of B in FIG. 4).

As shown in FIG. 9 and FIG. 10, in an embodiment of the present application, the magnetic circuit module further includes a T-shaped fixed block 150.

A T-shaped fixed block 150 is arranged between the coil bobbin 145*a* and the free end of the strain beam 120.

The T-shaped fixed block 150 includes a horizontal connection plate and a vertical connection plate arranged perpendicularly to each other.

The vertical connection plate is connected with the free end of the strain beam 120 through bolt clamping. The bottom surface of the horizontal connection plate is fixedly connected to the coil bobbin 145*a*.

Specifically, the free ends of the strain beam 120 are two ends of the strain beam 120, i.e., the ends where the strain beam 120 and the magnetic circuit device 140 are connected.

The T-shaped fixed block 150 is connected with the strain beam 120 through bolt clamping.

Figure 7:
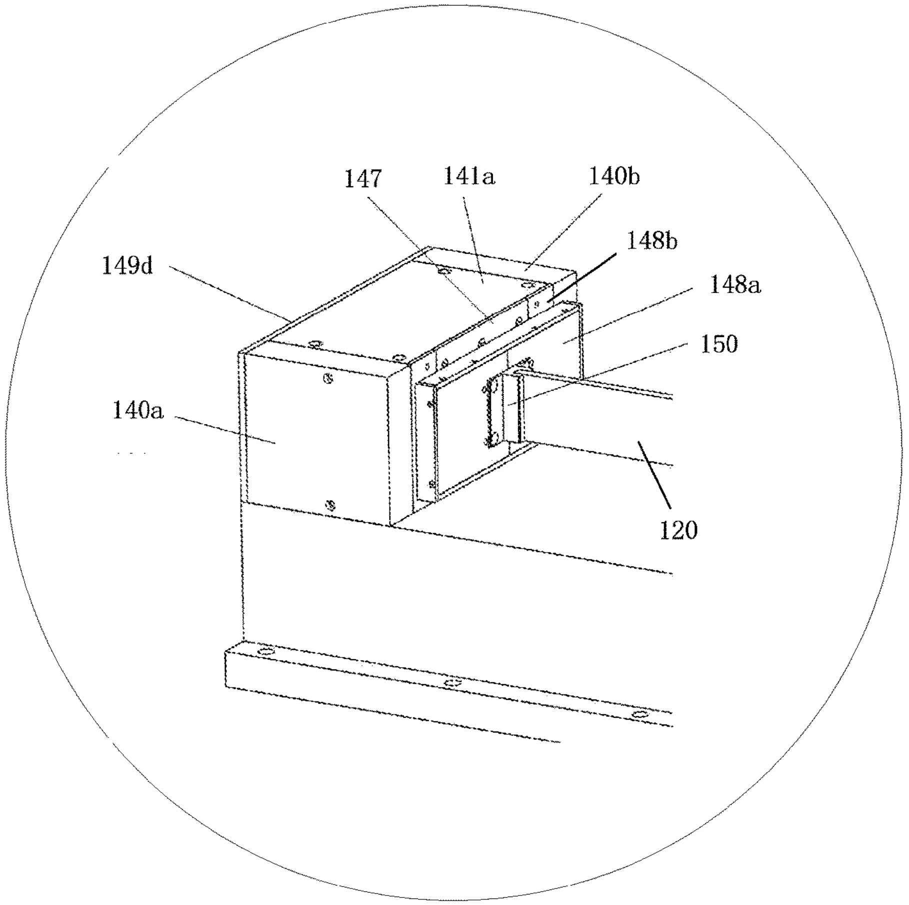
FIG. 7 is a three-dimensional view of one magnetic circuit device of the base strain generating device according to the embodiment illustrated in FIGS. 1 and 4 (enlarged view of B in FIG. 4).
Figure 8:
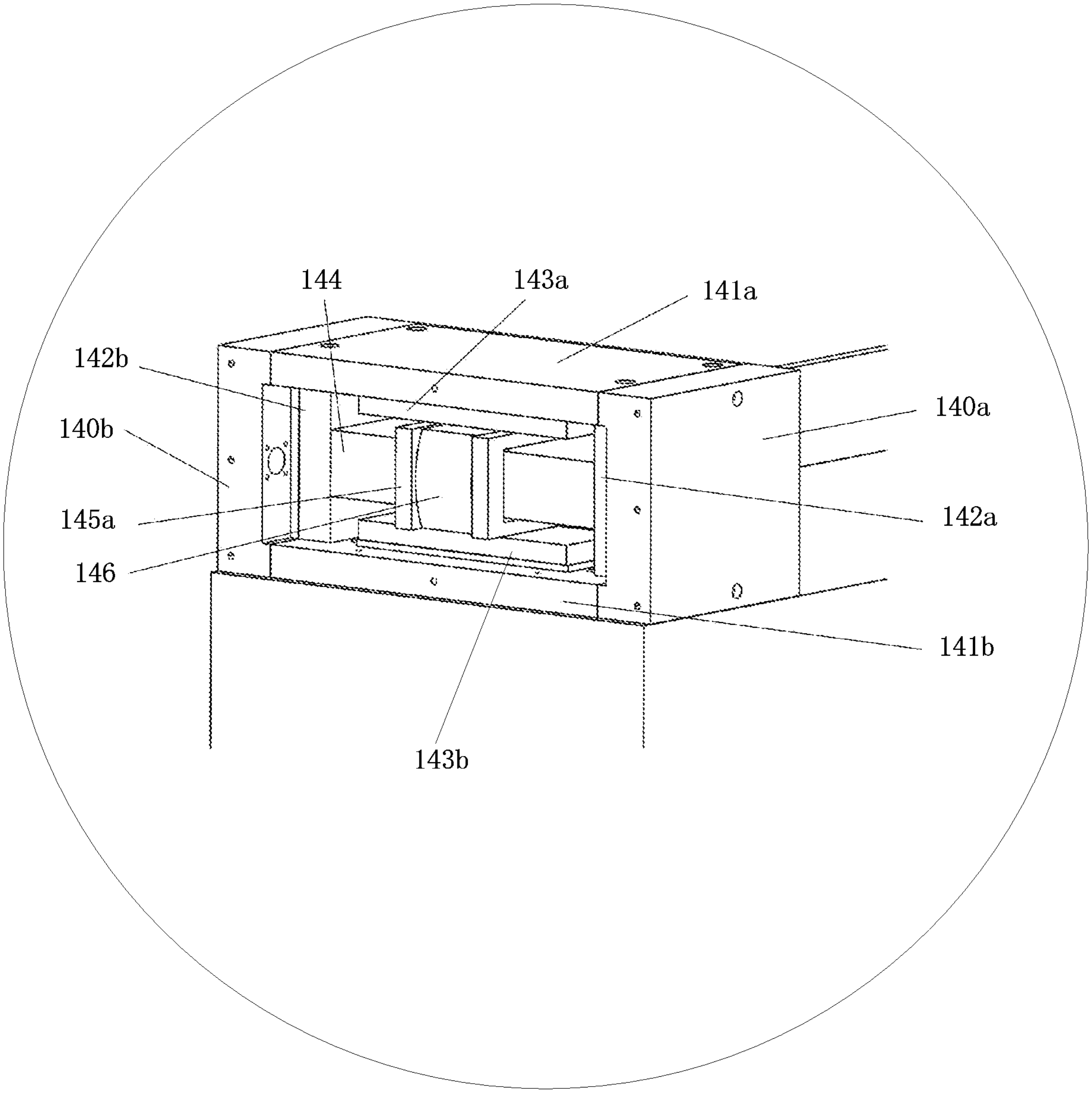
FIG. 8 is a three-dimensional view of one magnetic circuit device of the base strain generating device according to the embodiment illustrated in FIGS. 1 and 4 after removal of a sealing plate (enlarged view of B in FIG. 4).
Figure 11:
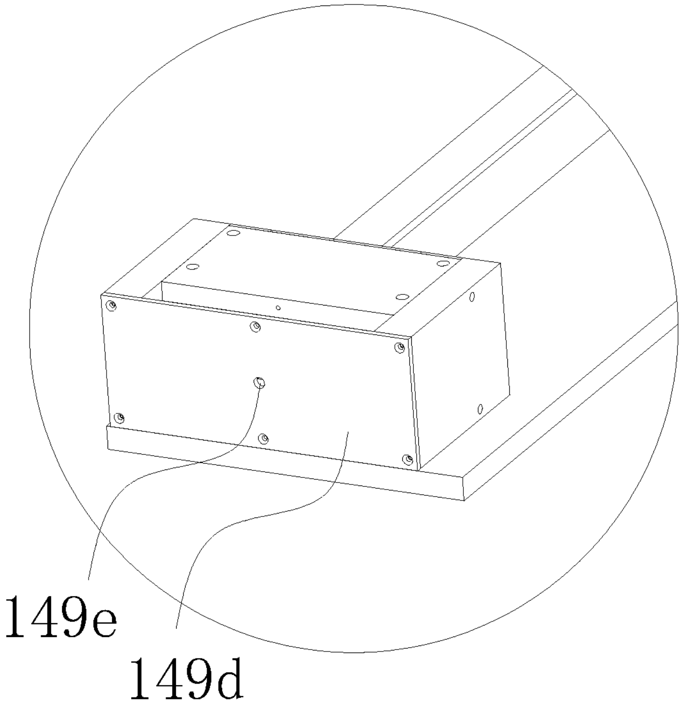
FIG. 11 is a schematic diagram of the setting position of a displacement sensor mounting hole in one magnetic circuit device of the base strain generating device according to the embodiment illustrated in FIGS. 1 and 4 (enlarged view of B in FIG. 4).

As shown in FIG. 7, in an embodiment of the present application, the magnetic circuit module further includes a pressing plate 147, a first side magnetic conductive plate 141*a*, a second side magnetic conductive plate 141*b*, a first protecting plate 140*a*, and a second protecting plate 140*b* and a sealing plate 149*d* (shown in FIG. 11).

The pressing plate 147, the first side magnetic conductive plate 141*a*, the second side magnetic conductive plate 141*b*, the first protecting plate 140*a*, the second protecting plate 140*b* and the sealing plate 149*d* surround collectively to form the magnetic circuit device 140.

Specifically, the first side magnetic conductive plate 141*a* and the second side magnetic conductive plate 141*b* are arranged parallel to each other. The first side magnetic conductive plate 141*a* and the second side magnetic conductive plate 141*b* are both perpendicular to the pressing plate 147 and are fixedly connected to the pressing plate 147. The first side magnetic conductive plate 141*a* and the second side magnetic conductive plate 141*b* are both perpendicular to the sealing plate 149*d* and are fixedly connected to the sealing plate 149*d*. The first protecting plate 140*a* and the second protecting plate 140*b* are arranged parallel to each other. The first protecting plate 140*a* and second protecting plate 140*b* are both perpendicular to the pressing plate 147 and are fixedly connected to the pressing plate 147, the first protecting plate 140*a* and the second protecting plate 140*b* are both perpendicular to the sealing plate 149*d* and are fixedly connected to the sealing plate 149*d*.

Furthermore, the magnetic circuit module further includes a limiting plate 148*b*. The limiting plate 148*b* is located above the yoke 144. The limiting plate 148*b* is arranged on the top of the protection box 5. A first side of the limiting plate 148*b* is fixedly connected to the first side magnetic conductive plate 141*a*. A second side of the limiting plate 148*b* is fixedly connected to the second side magnetic conductive plate 141*b*. In the energized state, the coil bobbin 145*a* drives the free ends of the strain beam 120 to swing. By controlling the frequency and size of the sinusoidal current, the strain beam 120 swings at different frequencies. The limiting plate 148*b* is used to limit the swing range, thereby protecting the device from damage due to excessive strain caused by excessive swing amplitude.

As shown in FIG. 9, in one embodiment of the present application, the strain generating device further includes a first boss 149*a* and a second boss 149*b*. The first boss 149*a* is of a plate shape. The second boss 149*b* is of a plate shape.

The first boss 149*a* is parallel to the second boss 149*b*, and a spacing is formed between the first boss 149*a* and the second boss 149*b*. The first boss 149*a* is fixedly connected to the first side magnetic conductive plate 141*a*, and the second boss 149*b* is fixedly connected to the second side magnetic conductive plate 141*b*.

Specifically, the height of the first boss 149*a* is less than the height of the first side magnetic conductive plate 141*a*, and the height of the second boss 149*b* is less than the height of the second side magnetic conductive plate 141*b*. The first boss 149*a* is of a plate shape, and is arranged close to the first side magnetic conductive plate 141*a* and is parallel to the first side magnetic conductive plate 141*a*. The second boss 149*b* is of a plate shape, and is arranged close to the second side magnetic conductive plate 141*b* and is parallel to the second side magnetic conductive plate 141*b*.

Furthermore, the height herein refers to the length in the height direction, and the height direction refers to the direction in which the sealing plate 149*d* faces the T-shaped fixed block 150.

The coil bobbin 145*a* is located between the first magnet 143*a* and the second magnet 143*b*. The coil bobbin 145*a* is provided with a yoke 144 inside. There is a certain magnetic gap 1 between the coil bobbin 145*a* and the first magnet 143*a*. As shown in FIG. 14, there is a certain magnetic gap 1 between the coil bobbin 145*a* and the second magnet 143*b*. There is a certain magnetic gap 1 between the yoke 144 and the base, and the first magnet 143*a* is parallel to the second magnet 143*b*. As shown in FIG. 9, the first magnet 143*a* is arranged close to the first boss 149*a*, the first magnet 143*a* abuts against the inner surface of the first side magnetic conductive plate 141*a*; the second magnet 143*b* is arranged close to the second boss 149*b*, the second magnet 143*b* abuts against the inner surface of the second side magnetic conductive plate 141*b*, the coil bobbin 145*a* is located between the first magnet 143*a* and the second magnet 143*b*, and the yoke 144 is located in the hollow portion of the coil bobbin 145*a*. The yoke 144 is made of permeability magnetic materials.

Specifically, the coil bobbin 145*a* is configured as a rectangular frame and has a hollow portion. The first magnet 143*a* and the second magnet 143*b* are both magnetic. The yoke 144 has no magnetism. The yoke 144 is made of permeability magnetic materials. After being energized, the middle portion of the yoke 144 can conduct magnetism to form a magnetic field. A first air-gap magnetic field is formed between the first magnet 143*a* and the yoke 144, and a second air-gap magnetic field is formed between the second magnet 143*b* and the yoke 144. The coil bobbin 145*a* is located between the first air-gap magnetic field and the second air-gap magnetic field, so that there is a gap between the coil bobbin 145*a* and the pressing plate 147, between the coil bobbin 145*a* and the first magnet 143*a*, between the coil bobbin 145*a* and the second magnet 143*b*, between the coil bobbin 145*a* and the yoke 144. In addition, under the action of sinusoidal current, an ampere force is generated between the first magnet 143*a* and the coil bobbin 145*a*, between the second magnet 143*b* and coil bobbin 145*a*. There is a left magnetic inductance line 2 between the first magnet and the yoke, and there is a right magnetic inductance line 3 between the second magnet 143*b* and the yoke, as shown in FIG. 14.

In an embodiment of the present application, the inner surface of the first side magnetic conductive plate 141*a* is configured as a convex surface, and the inner surface of the second side magnetic conductive plate 141*b* is configured as a convex surface.

Specifically, the first magnet 143*a* is adsorbed on the inner surface of the first side magnetic conductive plate 141*a*, and the second magnet 143*b* is adsorbed on the inner surface of the second side magnetic conductive plate 141*b*.

Specifically, the distance between the first magnet 143*a*, the second magnet 143*b*, and the yoke 144 is preset, the first magnet 143*a* is fixed on the inner surface of the first side magnetic conductive plate 141*a*, and the second magnet 143*b* is fixed on the inner surface of the second side magnetic conductive plate 141*b*.

As shown in FIG. 7, in an embodiment of the present application, the strain generating device further includes a cover plate 148*a*.

The cover plate 148*a* is fixedly connected to the T-shaped fixed block 150.

Specifically, the cover plate 148*a* is used to form a closed space inside the magnetic circuit device 140, to cover the magnetic circuit device 140 and prevent foreign matters from falling into the magnetic circuit device 140.

The T-shaped fixed block 150 is embedded in the cover plate 148*a*, and the horizontal connection plate of the T-shaped fixed block 150 is fixedly connected to the cover plate 148*a*, so that the cover plate 148*a* and the T-shaped fixed block 150 move together with the swing of strain beam 120 when the strain beam 120 swings.

As shown in FIG. 10, in an embodiment of the present application, the strain generating device further includes a first yoke fixed plate 142*a* and a second yoke fixed plate 142*b*.

The first yoke fixed plate 142*a* is parallel to the second yoke fixed plate 142*b*.

The first yoke fixed plate 142*a* is fixedly connected to the inner surface of the first protecting plate 140*a* through bolts. The second yoke fixed plate 142*b* is fixedly connected to the inner surface of the second protecting plate 140*b* through bolts. The first yoke fixed plate 142*a* is fixedly connected to the yoke 144 through bolts, and the second yoke fixed plate 142*b* is fixedly connected to the yoke 144 through bolts to fix the mounting position of the yoke 144.

Specifically, the first protecting plate 140*a* covers the outer surface of the first yoke fixed plate 142*a*, and the first protecting plate 140*a* is not directly connected to the first yoke fixed plate 142*a*. One side of the first protecting plate 140*a* is fixedly connected to the first side magnetic conductive plate 141*a* through bolts, and the other side of the first protecting plate 20 is fixedly connected to the second side magnetic conductive plate 141*b* through bolts. One side of the first yoke fixed plate 142*a* is fixedly connected to the first side magnetic conductive plate 141*a* through bolts, and the other side of the first yoke fixed plate 142*a* is fixedly connected to the second side magnetic conductive plate 141*b* through bolts. One side of the second yoke fixed plate 142*b* is fixedly connected to the first side magnetic conductive plate 141*a* through bolts, and the other side of the second yoke fixed plate 142*b* is fixedly connected to the second side magnetic conductive plate 141*b* through bolts.

The same applies to second protecting plate 140*b*. The second protecting plate 140*b* is not directly connected to the second yoke fixed plate 142*b*. One side of the second protecting plate 140*b* is fixedly connected to the first side magnetic conductive plate 141*a* through bolts, and the other side of the second protecting plate 140*b* is fixedly connected to the second side magnetic conductive plate 141*b* through bolts.

The first yoke fixed plate 142*a* and the second yoke fixed plate 142*b* are both made of permeability magnetic materials and have magnetic permeability function.

In this embodiment, alternating current is supplied to the drive coil 146, so that the coil bobbin 145 drives both ends of the strain beam 120 to swing. A connection plate is arranged between the coil bobbin and the strain beam 120 to form power transmission, and both ends of the strain beam 120 are inserted into a T-shaped fixed block 150 respectively, so that the T-shaped fixed block 150 applies momentum only to the ends of the strain beam 120.

The present application also provides a base strain sensitivity testing system 10.

Figure 15:
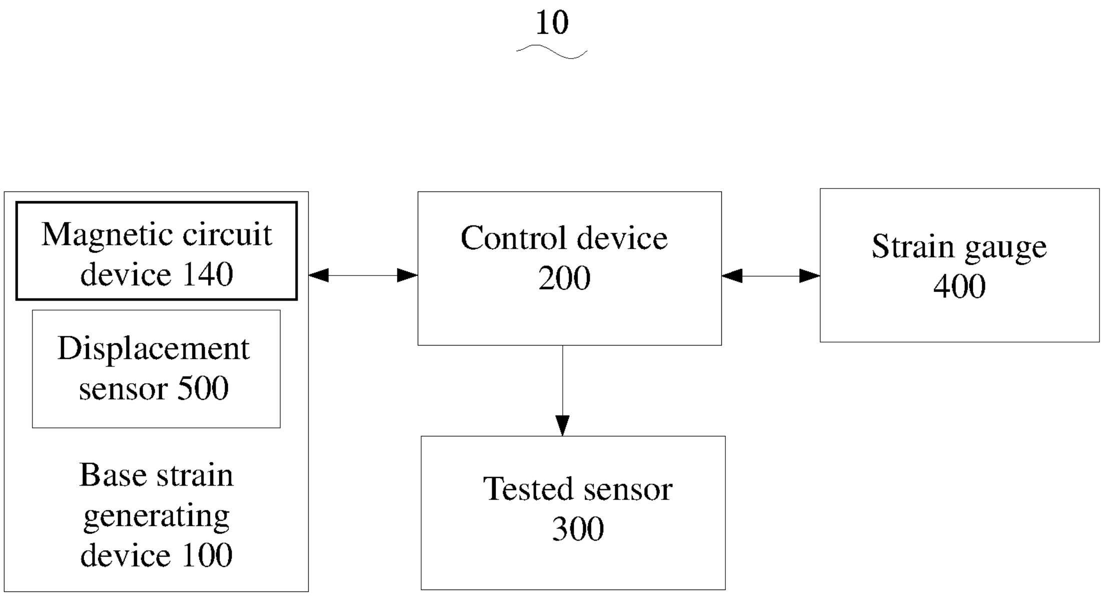
FIG. 15 is a schematic structural diagram of a frame of a base strain sensitivity testing system according to an embodiment of the present application.

As shown in FIG. 15, in an embodiment of the present application, the base strain sensitivity testing system 10 also includes the base strain generating device 100 as foregoing described, a tested sensor 300, at least two strain gauges 400, two strain gauges 500 and a control device 200. The base strain generating device includes a base 110, a strain beam 120, a clamping assembly 130 and two magnetic circuit devices 140.

The tested sensor 300 is fixedly mounted on the mounting structure in the middle portion of the strain beam 120.

At least two strain gauges 400 are fixedly mounted in the middle portion of the strain beam 200. The strain gauges 400 are used for measuring strain values within a set range of the mounting structure 121.

One displacement sensor 500 is fixedly mounted on each of the magnetic circuit devices 140. The displacement sensors are used for measuring initial positions of the two ends of the strain beam 120 when the strain beam 120 is static, and after the initial positions of the two ends of the strain beam 120 are used as displacement zero points of the two ends of the strain beam 120, the two ends of the strain beam 120 are maintained to swing at equal amplitude on the two sides of the displacement zero points all the time through feedback control in the moving process.

The control device 200 is connected to the magnetic circuit device 140, the tested sensor 300, the strain gauge 400 and the displacement sensor 500 respectively. The control device 200 is used for at least controlling the magnitude and frequency of sinusoidal excitation output by the magnetic circuit devices 140, obtaining the strain value output by the strain gauges 400, obtaining the displacement value output by the displacement sensors 500, and obtaining the acceleration value output by the tested sensor 300.

Figure 12:
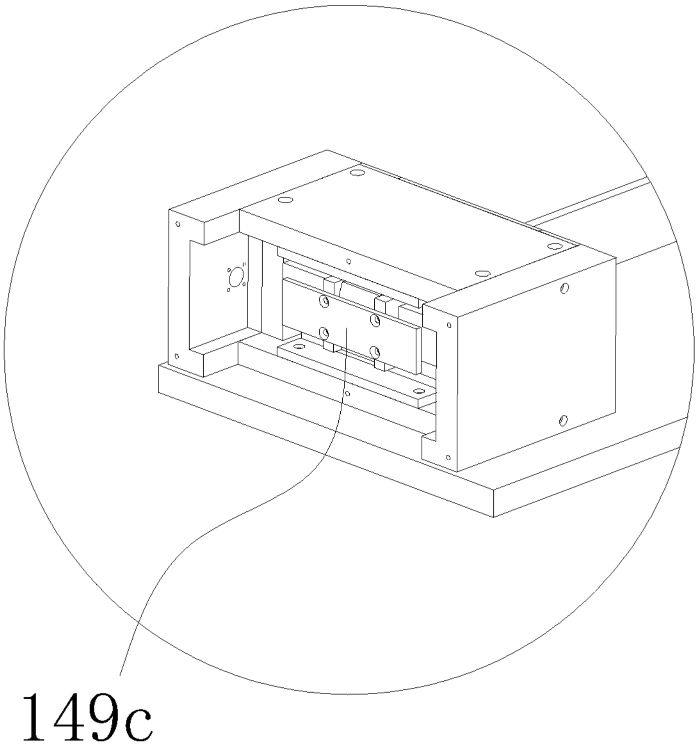
FIG. 12 is a schematic diagram of the setting position of a test body in one magnetic circuit device of the base strain generating device according to the embodiment illustrated in FIGS. 1 and 4 (enlarged view of B in FIG. 4).

Specifically, the sealing plate 149*d* of the magnetic circuit device 140 is provided with a displacement sensor mounting hole 149*e* (as shown in FIG. 11) for mounting the displacement sensor 500. The displacement sensor 500 is an eddy current sensor that enables non-contact measurement. The test body 149*c* (shown in FIG. 12) used with the displacement sensor 500 is mounted on the coil bobbin 145*a*. A displacement sensor 500 is respectively provided at both ends of the strain beam 120. The displacement sensor 500 is used to measure the initial positions of both ends of the strain beam 120 when the strain beam 120 is static, and maintain the two ends of the strain beam 120 to swing at equal amplitude on the two sides of the displacement zero points all the time through feedback control in the moving process. What the displacement sensor 500 specifically detects is the distance between the probe of the displacement sensor 500 and the test body 149*c* (shown in FIG. 12).

Two or four strain gauges 400 can be arranged. When two strain gauges are arranged, the circuit structure is a half-bridge circuit, and when four strain gauges are arranged, the circuit structure is a full-bridge circuit. When the strain gauge 400 is arranged in the middle portion of the strain beam 120, the strain gauge 400 is arranged close to the tested sensor 300. Alternatively, the two strain gauges are used, the two strain gauges are arranged symmetrically with respect to the center of the tested sensor 300 at the middle portion of the strain beam 120.

Various technical features of the foregoing embodiments can be combined arbitrarily, and the execution sequence of each method and step is not limited. In order to make the description concise, not all possible combinations of technical features of the foregoing embodiments are described. However, as long as there is no contradiction in the combination of these technical features, it should be considered to fall within the protection scope of this specification.

The foregoing embodiments only describe several embodiments of the present application, and the descriptions are relatively specific and detailed, but should not be construed as limiting the patent scope of the present application. It should be noted that, for those of ordinary skill in the art, several modifications and improvements can be made without departing from the concept of the present application, and all these modifications and improvements shall fall within the protection scope of the present application. Accordingly, the scope of protection of the present application shall be subjected to the appended claims.

What is claimed is:

1. A base strain generating device for detecting a base sensitivity of a tested sensor, comprising:

a base;

a strain beam, a middle portion of the strain beam being provided with a mounting structure for fixedly mounting the tested sensor;

a clamping assembly, the clamping assembly being fixedly connected to the base and being used for clamping the middle portion of the strain beam so as to fix a position of the mounting structure;

two sets of magnetic circuit devices, the two sets of magnetic circuit devices being fixedly connected to the base respectively, wherein two ends of the strain beam are provided with one set of magnetic circuit devices respectively; the magnetic circuit devices are used for providing sinusoidal excitation for the two ends of the strain beam so as to enable the two ends of the strain beam to swing in a reciprocating manner, and a direction of the sinusoidal excitation is parallel to a direction of a sensitive axis of the tested sensor.

2. The base strain generating device according to claim 1, wherein the clamping assembly and the middle portion of the strain beam are clamped with each other in a line contact mode.

3. The base strain generating device according to claim 2, wherein the mounting structure is arranged to be a mounting hole site, the mounting hole site penetrates through the strain beam, and a central axis of the mounting hole site is parallel to the direction of sinusoidal excitation; when the tested sensor is fixedly mounted in the mounting hole site, the sensitive axis of the tested sensor coincides with the central axis of the mounting hole site.

4. The base strain generating device according to claim 3, wherein the clamping assembly comprises:

a frame, comprising a bottom plate and an overhanging arm, the bottom plate being fixedly connected to the base;

a fixed rod, which is fixedly arranged on the bottom plate, a top surface of the fixed rod being opposite to a bottom surface of the strain beam, and a gap being formed between the top surface of the fixed rod and the bottom surface of the strain beam;

a movable screw, which is connected to the overhanging arm via a bolt, a mounting direction of the movable screw coinciding with a central axis of the fixed rod and being perpendicular to and intersecting with the central axis of the mounting hole site; a bottom surface of the movable screw being opposite to a top surface of the strain beam, and a gap being formed between the bottom surface of the movable screw and the top surface of the strain beam; and when the movable screw is rotated, the movable screw and the fixed rod approach each other so that the strain beam can be clamped between the movable screw and the fixed rod.

5. The base strain generating device according to claim 4, wherein a first positioning groove is formed in the top surface of the strain beam, and a first conical portion is arranged at an end, close to the strain beam, of the movable screw; a minimum diameter of the first conical portion is smaller than an inner diameter of the first positioning groove, and a maximum diameter of the first conical portion is larger than the inner diameter of the first positioning groove; when the strain beam is clamped, at least part of the first conical portion is inserted into the first positioning groove.

6. The base strain generating device according to claim 5, wherein a second positioning groove is formed in the bottom surface of the strain beam, and a second conical portion is arranged at an end, close to the strain beam, of the fixed rod; a minimum diameter of the second conical portion is smaller than an inner diameter of the second positioning groove, and a maximum diameter of the second conical portion is larger than the inner diameter of the second positioning groove; when the strain beam is clamped, at least part of the second conical portion is inserted into the second positioning groove.

7. The base strain generating device according to claim 3, wherein the clamping assembly comprises:

a first T-shaped steel, comprising a first horizontal section and a first vertical section which are fixedly connected with each other;

a second T-shaped steel, comprising a second horizontal section and a second vertical section which are fixedly connected with each other; the first horizontal section and the second horizontal section being oppositely arranged, and a spacing being formed between the first horizontal section and the second horizontal section, the first vertical section and the second vertical section being oppositely arranged, and a spacing being formed between the first vertical section and the second vertical section;

a sealing plate covering a top surface of the first vertical section and a top surface of the second vertical section, and the sealing plate being fixedly connected with the top surface of the first vertical section and the top surface of the second vertical section respectively;

a plurality of first arc-shaped pieces which are fixedly connected to a surface, close to the second vertical section, of the first vertical section;

a plurality of second arc-shaped pieces which are fixedly connected to a surface, close to the first vertical section, of the second vertical section; each first arc-shaped piece being provided with one second arc-shaped piece which is arranged opposite to the first arc-shaped piece; the first arc-shaped pieces and the second arc-shaped pieces, which are oppositely arranged, being located on a same horizontal plane;

a supporting block which is arranged between the first T-shaped steel and the second T-shaped steel; a first spacing being formed between the first horizontal section and the supporting block, and a second spacing being formed between the second horizontal section and the supporting block; and when the clamping assembly is in a use state, the middle portion of the strain beam is clamped between the first arc-shaped pieces and the second arc-shaped pieces, a bottom of the strain beam abuts against a top surface of the supporting block so that the supporting block supports the strain beam.

8. The base strain generating device according to claim 7, wherein the clamping assembly further comprises:

a groove which is formed in the top surface of the supporting block;

a supporting bead which is embedded into the groove, a groove face of the groove being matched with the supporting bead in shape; and when the clamping assembly is in the use state, a top of the supporting bead makes point contact with a bottom surface of the strain beam, and a bottom of the supporting bead makes surface contact with the groove face of the groove, so that the supporting block supports the strain beam.

9. The base strain generating device according to claim 8, wherein the clamping assembly further comprises:

a tightening auxiliary mechanism which is arranged on a side, away from the first vertical section, of the second vertical section;

when the first T-shaped steel is tightened and fixed to the base and the middle portion of the strain beam is arranged between the first arc-shaped piece and the second arc-shaped piece, the tightening auxiliary mechanism moves in a direction close to the second T-shaped steel and is tightened, the tightening auxiliary mechanism abuts against the second vertical section, so that the second arc-shaped piece abuts against the middle portion of the strain beam, and the first arc-shaped piece and the second arc-shaped piece clamp the middle portion of the strain beam.

10. A base strain sensitivity testing system, comprising:

the base strain generating device of claim 1;

a tested sensor which is fixedly mounted on the mounting structure in the middle portion of the strain beam;

at least two strain gauges which are fixedly mounted in the middle portion of the strain beam and used for measuring strain values within a set range of the mounting structure;

two displacement sensors, each being fixedly mounted on a respective one of the two sets of magnetic circuit devices, the displacement sensors being used for measuring initial positions of the two ends of the strain beam when the strain beam is static, and after the initial positions of the two ends of the strain beam are used as displacement zero points of the two ends of the strain beam, the two ends of the strain beam being maintained to swing at equal amplitude on two sides of the displacement zero points through feedback control at all times during a moving process; and a control device which is connected to the magnetic circuit devices, the tested sensor, the strain gauges and the displacement sensors and used for at least controlling a magnitude and frequency of the sinusoidal excitation output by the magnetic circuit devices, obtaining the strain values output by the strain gauges, obtaining displacement values output by the displacement sensors and obtaining an acceleration value output by the tested sensor.

* * * * *